United States Patent [19]
Stubbs

[11] Patent Number: 6,070,555
[45] Date of Patent: Jun. 6, 2000

[54] PORTABLE APPARATUS FOR CONTAINING AN ANIMAL AND METHOD OF USE

[76] Inventor: R. Clay Stubbs, HC3 Box 38, Johnson City, Tex. 78636

[21] Appl. No.: 09/119,389

[22] Filed: Jul. 20, 1998

[51] Int. Cl.⁷ .................................................. A01K 37/00
[52] U.S. Cl. ...................... 119/712; 119/751; 119/752; 119/453; 119/722; 280/478.1; 280/479.1
[58] Field of Search ..................................... 119/712, 751, 119/752, 400, 453, 722, 723, 724; 296/24.2; 280/478.1, 479.1, 480.1, 491.3

[56] References Cited

U.S. PATENT DOCUMENTS

| | | | | |
|---|---|---|---|---|
| 3,574,388 | 4/1971 | Stone | ...................................... | 296/168 |
| 4,201,157 | 5/1980 | Lambert | .................................. | 119/752 |
| 4,214,555 | 7/1980 | Sawby | ..................................... | 119/723 |
| 4,228,766 | 10/1980 | Wedman | ................................. | 119/723 |
| 4,339,147 | 7/1982 | Kimzey | ................................... | 296/24.2 |
| 4,809,644 | 3/1989 | Wells, Jr. | ................................. | 119/400 |
| 5,624,129 | 4/1997 | Clark, Jr. | ............................. | 280/478.1 |
| 5,772,230 | 6/1998 | Kemnitz | ................................ | 280/491.3 |

*Primary Examiner*—Peter M. Poon
*Assistant Examiner*—Judith A. Nelson
*Attorney, Agent, or Firm*—Ted Masters

[57] ABSTRACT

A portable apparatus (20) for containing an animal includes a stock (22) for receiving the animal, a tongue (24) pivotally connected to the stock (22), and a variable length controller (26) connected between the stock (22) and the tongue (26). The opposite towing end (30) of tongue (24) is connected to a towing vehicle (500). When the variable length controller (26) is placed in an extended position, stock (22) pivots about first (38) and second (42) wheels to a substantially vertical position suitable for receiving an animal. When variable length controller (26) is placed in a retracted position, stock (22) pivots to a substantially horizontal position above tongue (24), and may be conveniently towed between locations.

4 Claims, 8 Drawing Sheets

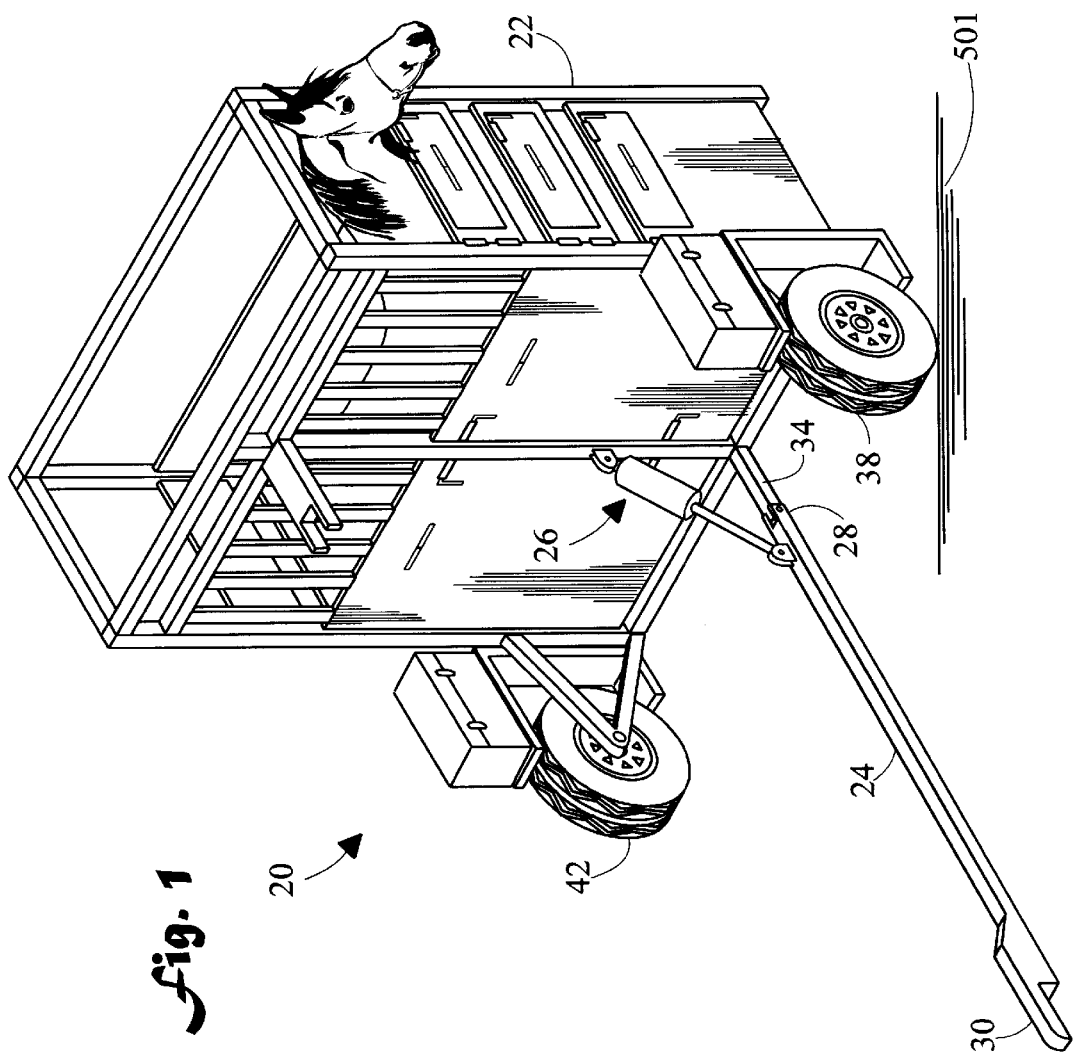

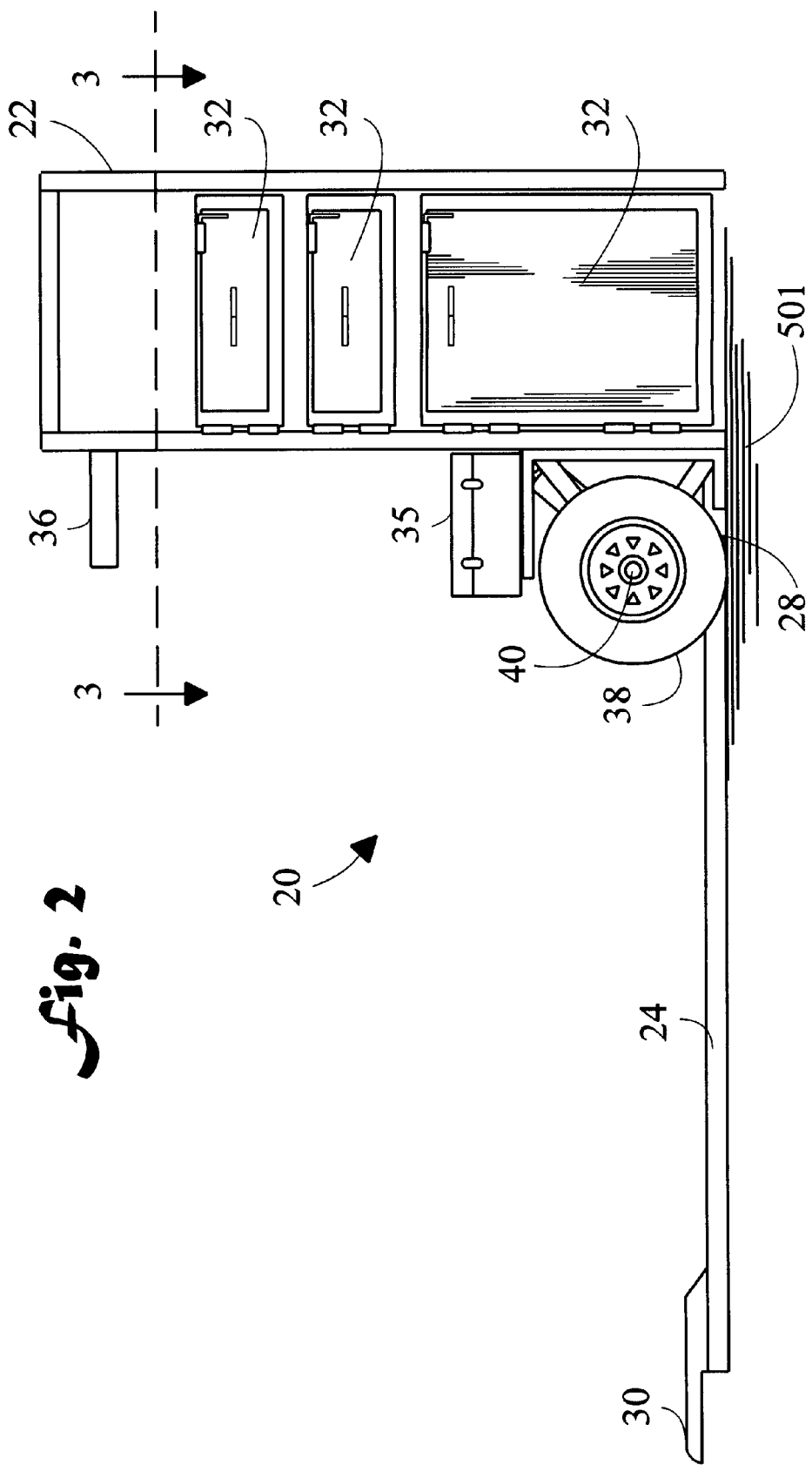

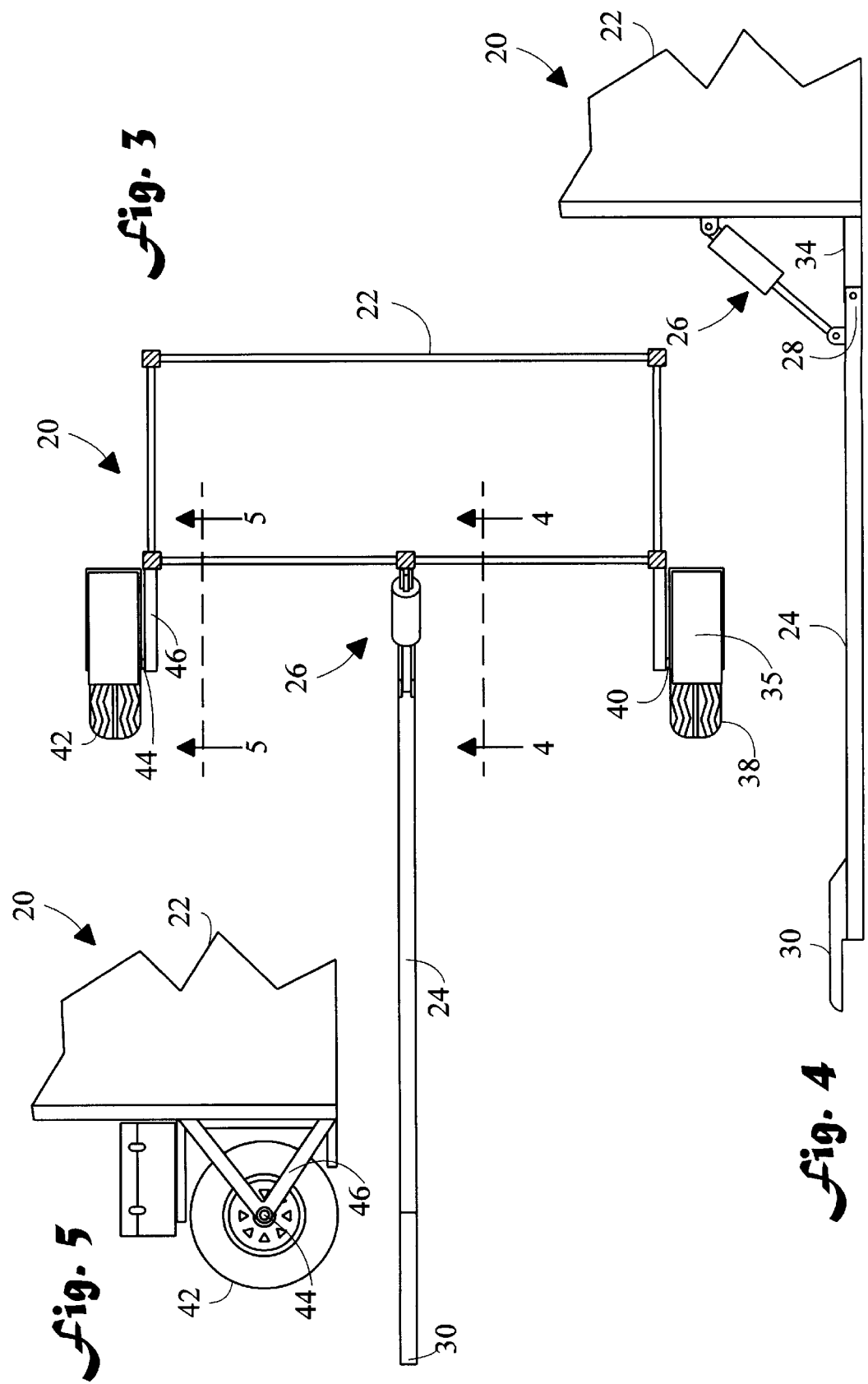

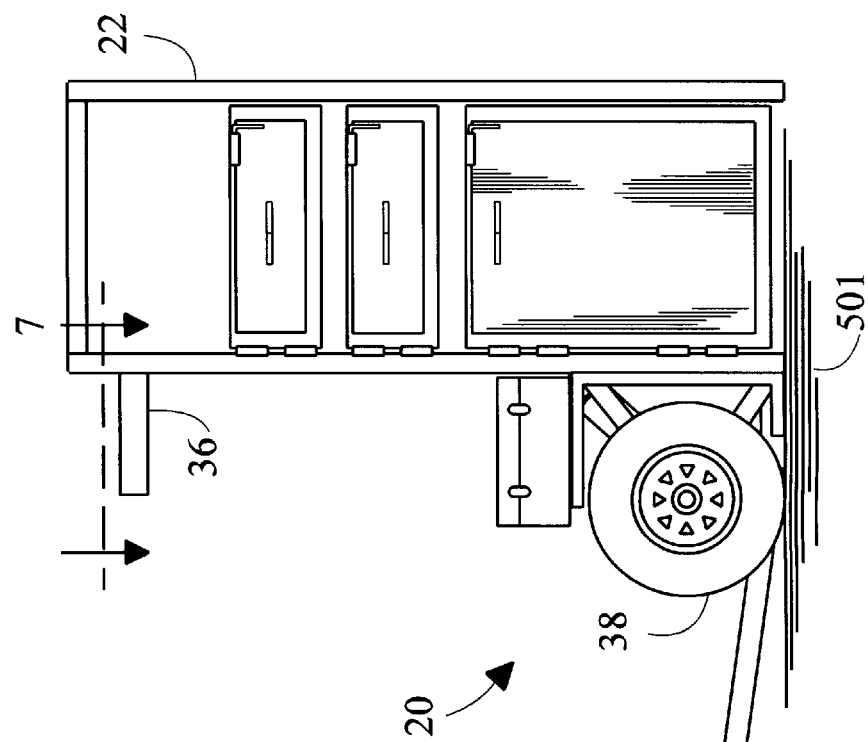
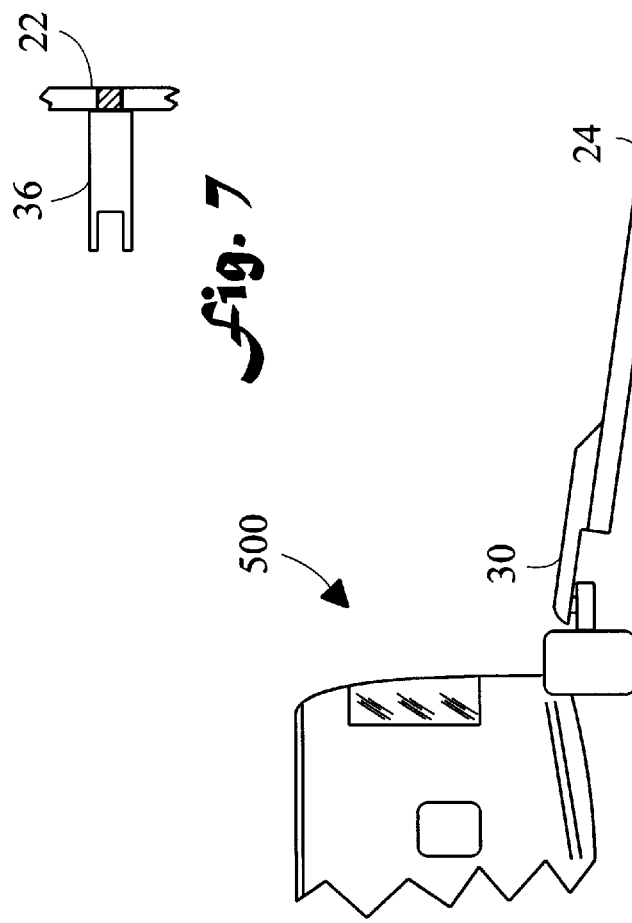
Fig. 6
Fig. 7

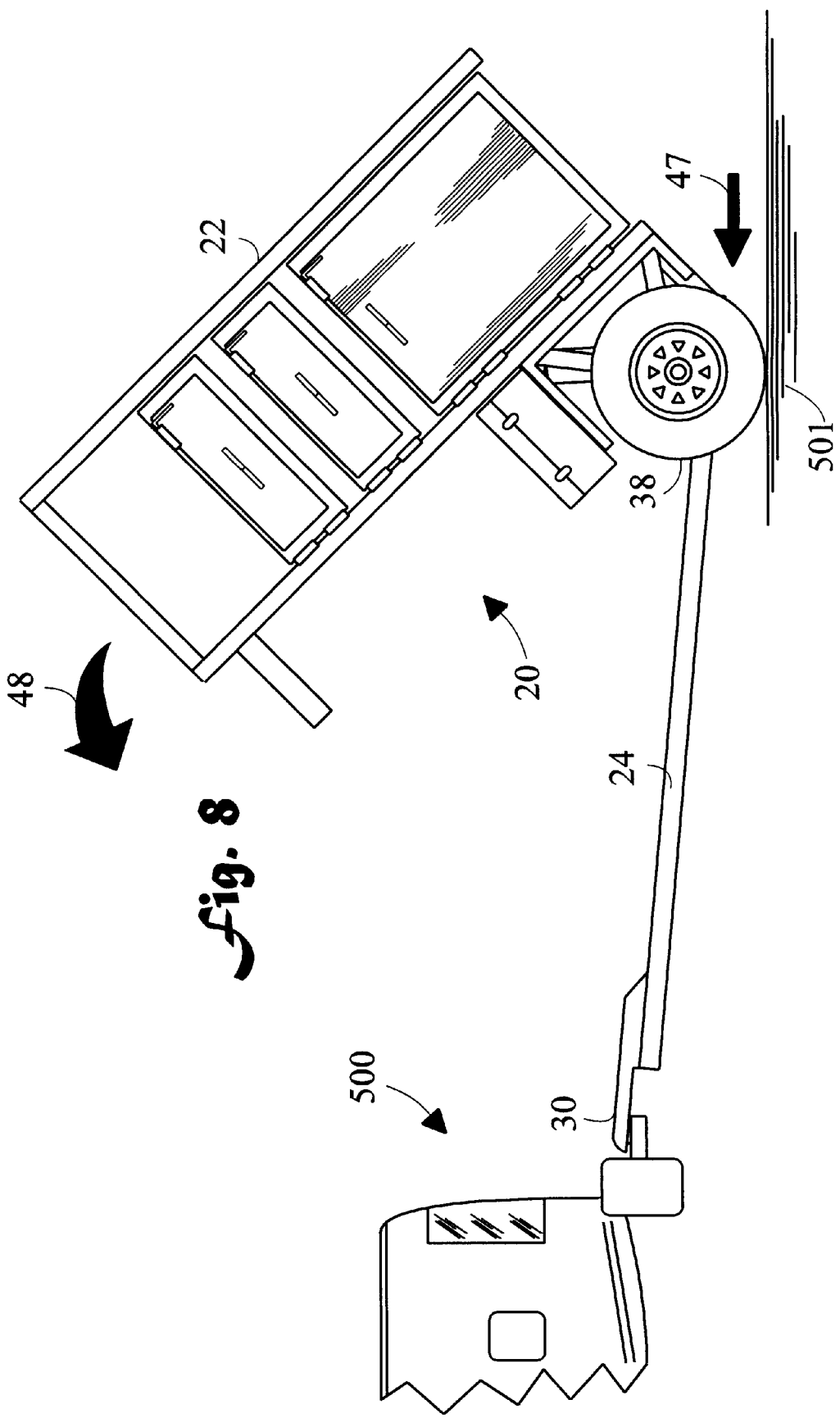

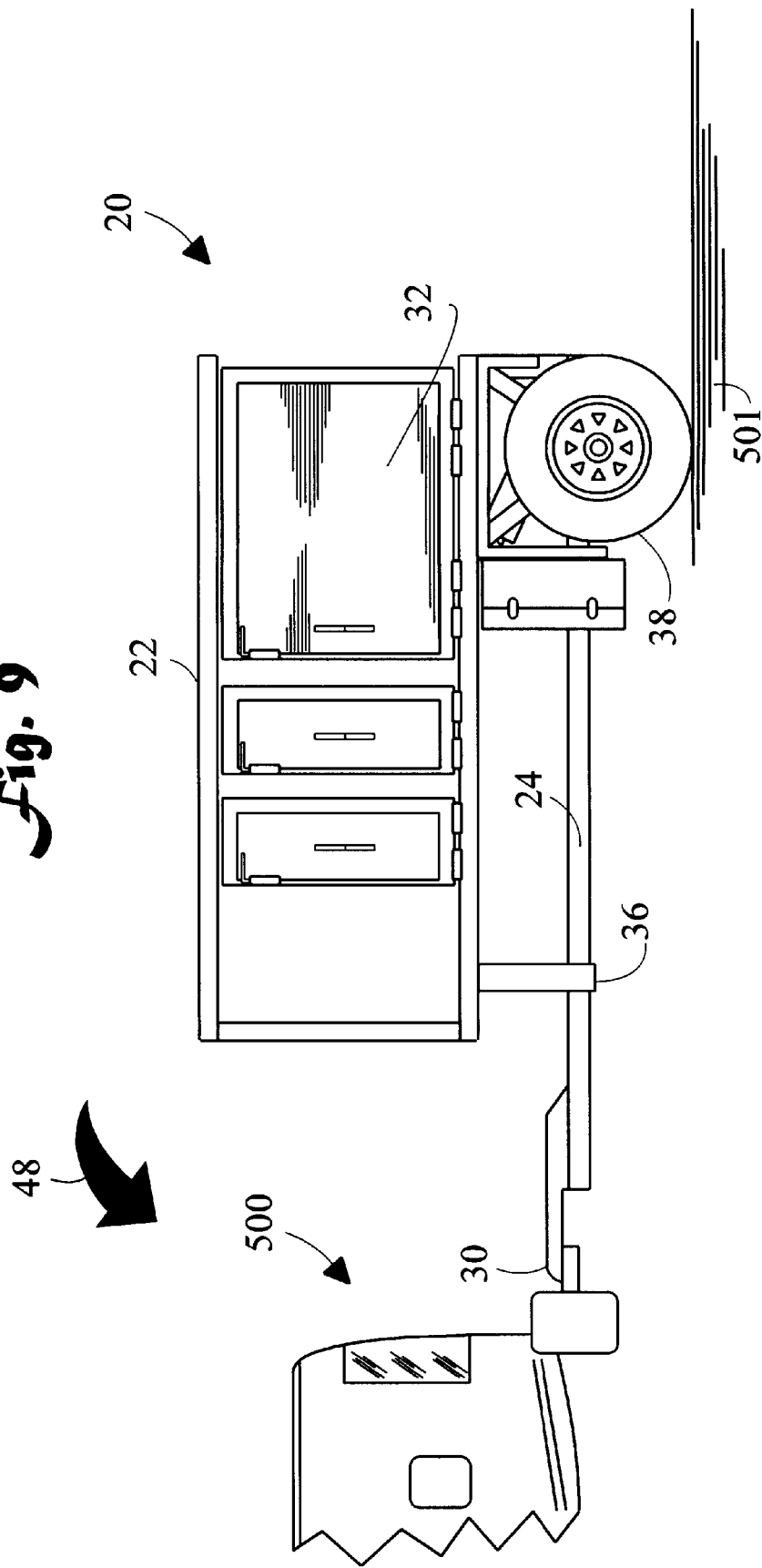

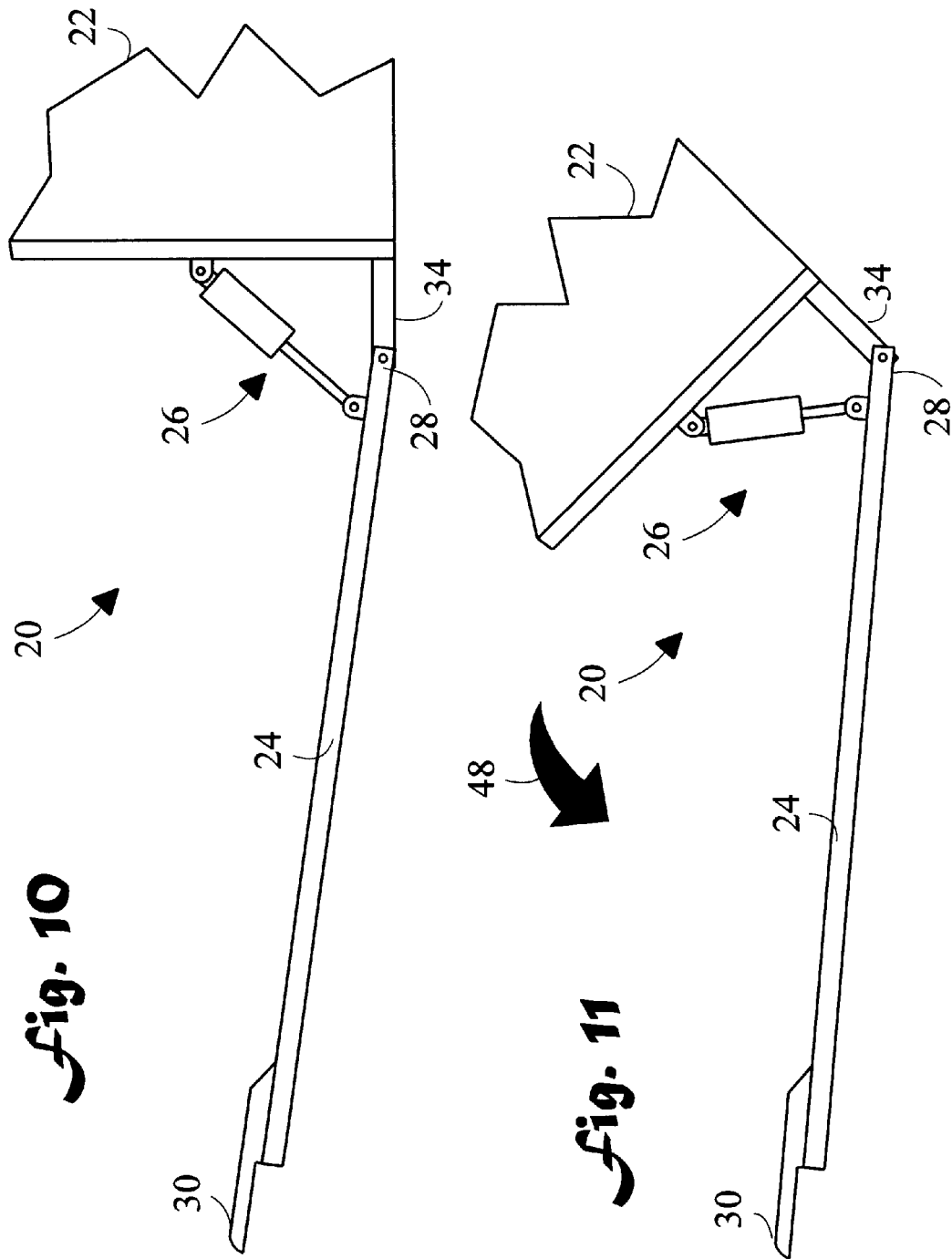

PORTABLE APPARATUS FOR CONTAINING AN ANIMAL AND METHOD OF USE

TECHNICAL FIELD

The present invention pertains to devices for containing or otherwise holding animals, and in particular to a portable stock which may be towed by a vehicle, and which may be selectively oriented in either horizontal or vertical positions.

BACKGROUND ART

Devices for containing animals for the administration of various veterinary procedures are well know in the art. Certain of these devices are additionally portable and may be readily moved from location to location by a towing vehicle. For example, U.S. Pat. No. 2,683,441 illustrates an animal holding chute for holding, calves or other farm animals in a recumbent position to facilitate the treatment or the performance of various veterinarian functions on the animal. The chute generally comprises a cage having a carriage composed of wheels disposed at the front and rear ends of the cage. Each wheel includes a rim and spokes and a pair of front vertical bars. Stationary and movable sides are disposed between the wheels, and contain the animal. U.S. Pat. No. 3,590,784 comprises a livestock tipping table and stall. The device is utilized to tip a horse or the like from a normally standing position to a generally horizontal position so as to enable a person to perform various operations upon the animal while it is laying upon its side. The tipping table extends vertically in order to permit strapping of the animal. After the animal has been securely strapped to the table, a fluid-actuated piston and rod is caused to retract within a cylinder. One end of the cylinder is pivotally mounted about a fixed pivot point while the opposing end of the piston rod is pivotally mounted at a pivot point on the table. As the piston rod is retracted, the table tilts about a fixed axis. U.S. Pat. No. 4,201,157 discloses a portable animal handling unit. A wheeled frame having sidewalls and a bed form and animal walkway, and a self-contained hydraulic system to move the bed from an elevated travel position to a general ground level for passing animals through the unit. A front elevating assembly forms the frame into a chute for loading animals into vehicles with elevated floors. U.S. Pat. No. 4,214,555 describes a portable cattle restraining apparatus, or cattle vise, useful in the procedure for trimming an animal's hoofs while maintaining it docile. The apparatus clamps the animal in a manner which imparts lifting force, while at the same time restraining movement. The frame which houses the clamp rotates so as to tilt the animal sideways, and the completely open bottom of the frame affords unrestricted access to the hoofs of the animal. The entire frame rests on the ground for maximum stability, but is converted into a trailer by rotation of a jackstand. U.S. Pat. No. 4,228,766 depicts a truck-mounted cattle control box which is mounted upon a small two wheeled trailer that can be towed by a tractor, truck or the like. The box is pivotally secured or mounted upon the axle and a hand operated fluid operator extends between the front of the trailer and one side of the box so that the box can be placed in a vertical position with the base on the ground whereupon an animal can be placed in or removed from the box, and the box can be rotated upon the axle through approximately 90° so that it is lying on its side with the animal held firmly in the box for treatment. U.S. Pat. No. 5,669,332 shows an portable chute for immobilizing an animal. The device has a front gate, a rear gate, and a stanchion for immobilizing the animal, all of which are operable by a single operator for a single location at the rear of the chute. The chute is pivotally mounted onto the bed of a vehicle and is rotatable by a fluid-operated cylinder between a horizontal or hoof-trimming position on the bed of the vehicle and an upright, vertical position.

DISCLOSURE OF INVENTION

The present invention is directed to a portable apparatus for containing or holding animals for the purpose of performing veterinary procedures. While the present invention is intended primarily for the treatment of horses, it may be appreciated that it could be applied to numerous other animal species as well. The present invention comprises a stock for receiving the standing animal, a tongue pivotally connected to the stock, and a bidirectional variable length controller pivotally connected between the stock and the tongue. The stock rides on a pair of wheels about which it pivots, and the towing end of the tongue is connected to a towing vehicle such as a truck. During towing, the wheels are positioned at the very rear of the horizontally oriented stock, thereby reducing any tendency for the apparatus to whip from side-to-side.

By extending the variable length controller, the stock and tongue are driven away from each other, and by retracting the variable length controller, the stock and tongue are pulled together. For example, in the towing position, the stock is in a horizontal position and resides above the tongue. Then when the variable length controller is placed in the extended position, the stock is pushed to an upright or vertical ready-for-use position, pivoting about the wheels in the process. Conversely, when the variable length controller is placed in the retracted position, the stock is pulled back to the horizontal. The stock can be transitioned between vertical and horizontal in less than one minute. A unique safety feature of the present invention resides in the fact that the tongue must be connected and locked to the towing vehicle in order to move the stock to the horizontal or towing position. This ensures that the apparatus is connected prior to being towed.

Another important feature of the present invention is that it has independently suspended wheel with no common traverse axle. This allows easy access to all sides of the stock when it is in the vertical position. Also, the tongue moves all the way to the ground and is thereby out of the way and can be stepped over with ease. Or, the tongue may be moved to a vertical out-of-the-way position. Furthermore, the present invention does not require the use of stabilizing legs or jacks. In the towing position, the apparatus is stabilized by the towing vehicle and the two wheels. In the vertical position, the stock rests upon its floor.

In accordance with a preferred embodiment of the invention, a portable apparatus for containing an animal, includes a stock for receiving the animal in a standing position, an elongated tongue pivotally connected to the stock, and a bidirectional variable length controller such as an hydraulic cylinder and piston connected between the stock and the tongue.

In accordance with an important aspect of the invention, the variable length controller has an extended position and a retracted position, so that when the variable length controller is placed in the extended position the tongue projects outwardly from the stock, and when the variable length controller is placed in the retracted position the tongue rotates about 90° to abut the stock.

In accordance with an important feature of the invention, the stock has a yoke for receiving the tongue.

In accordance with another important aspect of the invention, the variable length controller is pivotally connected to both the tongue and the stock.

In accordance with another important feature of the invention, two independently suspended wheels are connected to the stock, and serve as a pivot point about which the stock rotates.

In accordance with an aspect of the invention, the tongue has a towing end which is selectively attachable to a towing vehicle. When the towing end of the tongue is fixedly attached to the vehicle, and the variable length controller is activated toward the extended position, the stock pivots about the wheels and assumes a substantially vertical orientation. When the variable length controller is activated to the retracted position, the stock pivots about the wheels and assumes a substantially horizontal orientation above and resting upon the tongue.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a perspective view of a portable apparatus for containing an animal in accordance with the present invention;

FIG. 2 is a side elevation view of the apparatus;

FIG. 3. is view along the line 3—3 of FIG. 2;

FIG. 4 is a fragmented view along the line 4—4 of FIG. 3;

FIG. 5 is a fragmented view along the line 5—5 of FIG. 3 FIG. 6 is a side elevation view of the apparatus connected to a towing vehicle with a stock in a vertical position;

FIG. 7 is a fragmented view along the line 7—7 of FIG. 6;

FIG. 8 is a side elevation view of the apparatus showing the stock moving from the vertical position to a horizontal position;

FIG. 9 is a side elevation view showing the stock in the horizontal position above a tongue;

FIG. 10 is a fragmented view of the tongue, a variable length controller, and the stock with the stock in the vertical position;

FIG. 11 is a fragmented view of the tongue, the variable length controller, and the stock with the stock moving from the vertical position to the horizontal position;

MODES FOR CARRYING OUT THE INVENTION

Figure 13:
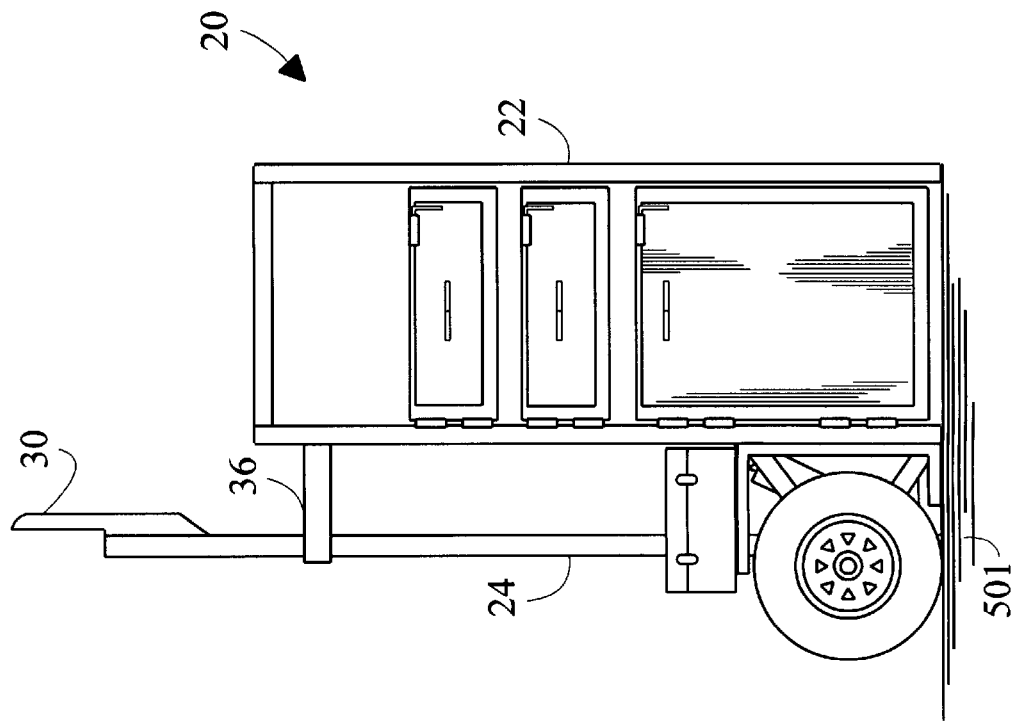

Referring initially the FIGS. 1, 2, 3, and 4 there are illustrated a perspective view, a side elevation view, a top view along line 3—3 of FIG. 2, and a side elevation view along the line 5—5 of FIG. 3 respectively, of a portable apparatus for containing an animal in accordance with the present invention, generally designated as 20. Apparatus 20 includes a stock 22 for receiving the animal, an elongated tongue 24 which is pivotally connected to stock 22, and a bidirectional variable length controller 26 which is pivotally connected to both stock 22 and tongue 24. Stock 22 comprises a box-shaped container having a plurality of gates 32 for accepting and retaining an animal. Stock 22 also has an outwardly projecting member 34 and a tongue-receiving yoke 36. Tongue 24 has a pivot end 28 and an opposite towing end 30. Pivot end 28 of tongue 24 is pivotally connected to member 34 of stock 22. Variable length controller 26 has an extended position as depicted in FIGS. 2 and 4, and a retracted position (refer to FIG. 12). When variable length controller 26 is in the extended position, tongue 24 project outwardly from stock 22. When variable length controller 26 is in the retracted position, tongue 24 abuts stock 22 and is received by yoke 36. Tongue 24 rotates approximately 90° between the extended and retracted positions. In a preferred embodiment, variable length controller 26 is a bidirectional hydraulic cylinder and piston assembly, of which numerous models are well known in the agricultural machinery art. However, an electric motor operated length controller could also be employed. In a preferred embodiment, the cylinder and piston are operated by 12 volts DC supplied by a battery which is charged by the towing vehicle. The hydraulic controls may be placed at any convenient location on apparatus 20, and in a preferred embodiment are placed in a control box 35 mounted on a wheel fender.

A first wheel 38 is connected to stock 22, first wheel 38 having a first axle 40 oriented substantially perpendicular to tongue 24. A second wheel 42 is also connected to stock 22 and spaced a predetermined distance (substantially the width of stock 22) from first wheel 38. Second wheel 42 has a second axle 44 which is also oriented substantially perpendicular to tongue 24. First axle 40 is substantially collinear with second axle 44, and first axle 40 and second axle 44 are disposed between towing end 30 of tongue 24 and stock 22.

FIG. 5 is a fragmented view along the line 5—5 of FIG. 3. Second wheel 42 is connected to stock 22 by connecting member 46. First wheel 38 is similarly connected to stock 22. In a preferred embodiment (not shown) a cushioning member is placed between connecting member 46 and stock 22 so as to absorb road irregularities during transport.

FIG. 6 is a side elevation view of the apparatus connected to a towing vehicle 500 with stock 22 in its vertical position or orientation wherein the floor of the stock resides upon the ground 501 or other support surface. Towing end 30 of tongue 24 is selectively attachable to towing vehicle 500. In a preferred embodiment towing vehicle 500 has a ball-type connector and towing end 30 of tongue 24 has a mating hitch. In FIG. 6, tongue 24 is fixedly attached to towing vehicle 500, length controller 26 is in the substantially extended position, and stock 22 is in its substantially vertical position suitable for receiving an animal. It is noted that in FIG. 6 variable length controller 26 has been retracted slightly to accommodate the height of the towing vehicle 500.

FIG. 7 is a fragmented view along the line 7—7 of FIG. 6 showing tonguereceiving yoke 36 connected to stock 22.

FIG. 8 is a side elevation view of apparatus 20 showing stock 22 moving in direction 48 from the vertical position to a horizontal position. It is noted that as stock 22 rotates, wheels 38 and 42 roll forward in direction 47. Apparatus 20 has a unique safety feature, wherein tongue 24 must be firmly connected to towing vehicle 500 in order for stock 22 to be pulled over into a horizontal position. If tongue 24 is not connected, activation of variable length controller 26 will simply cause tongue 24 to rotate to a vertical position.

FIG. 9 is a side elevation view showing stock 22 in the horizontal position above tongue 24. Yoke 36 engages tongue 24 to stabilize apparatus 20 during towing. Also of note is the fact that with stock 22 in the horizontal position gates 32 can be downwardly opened to a substantially horizontal position for use as a table.

FIG. 10 is a fragmented view of tongue 24, variable length controller 26, and stock 22 with stock 22 in the vertical position (refer also to FIG. 6). Variable length controller 26 is slightly retracted from the fully extended position.

FIG. 11 is a fragmented view of tongue 24, variable length controller 26, and stock 22 with stock 22 moving in direction 48 from the vertical position to the horizontal position (refer also to FIG. 8). Variable length controller 26 is approximately midway between the extended and retracted positions.

Figure 12:
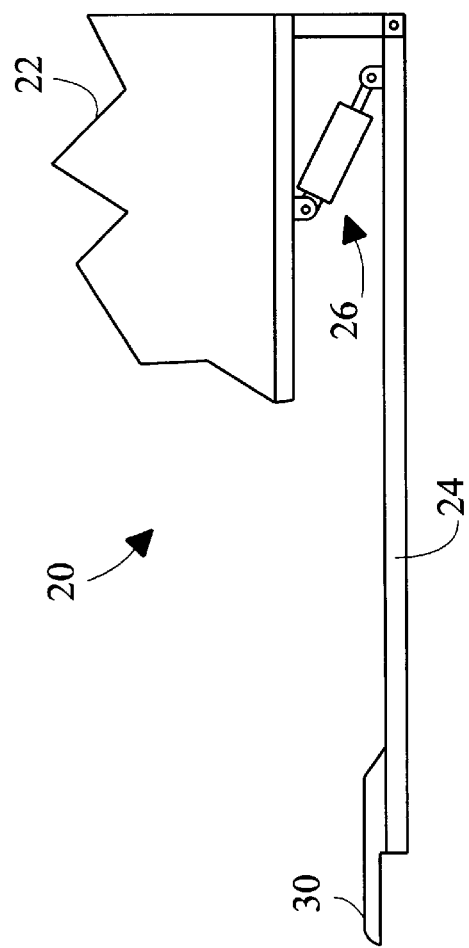
FIG. 12 is a fragmented view of the tongue, the variable length controller, and the stock with the stock in a horizontal position above the tongue; and, FIG. 13 is a side elevation view of the apparatus with the stock in the vertical position and the tongue in a vertical position.

FIG. 12 is a fragmented view of tongue 24, variable length controller 26, and stock 22 with stock 22 in a substantially horizontal position disposed above tongue 24 (refer also to FIG. 9). Variable length controller 26 is in the retracted position. It may be appreciated that the sequence depicted in FIGS. 10–12 can be reversed, whereby stock 22 is moved from the horizontal position to the vertical position. It may be further noted that as stock 22 transitions from the vertical to the horizontal as depicted in FIGS. 10–12, tongue 24 moves from a slight downward angle (FIG. 10) to a substantially horizontal position (FIG. 12).

FIG. 13 is a side elevation view of apparatus 20 with the stock 22 in the vertical position and tongue 24 in a vertical position. This position is useful in that tongue 24 is up and out of the way, as opposed to presenting a potential obstacle by lying upon the ground. The towing end 30 of stock 22 is unhooked from towing vehicle 500 and variable length controller 26 is activated to raise tongue 24 to a vertical position. When it is desired to rehook apparatus 20, vehicle 500 is backed into the proper position and variable length controller 26 is again activated to push tongue 24 down onto the ball-type connector of towing vehicle 500 (refer also to FIG. 6).

The operation of apparatus 20 is quite simple and can be effected in less than one minute. To ready apparatus 20 for towing, with stock 22 in the vertical position, variable length controller 26 is activated toward the extended position so that towing end 30 of tongue 24 may be connected to the towing vehicle 500. Variable length controller 26 is then activated to the retracted position so that stock 22 pivots about first 38 and second 42 wheels to assume a substantially horizontal position above tongue 24 with yoke 36 receiving tongue 24. Vehicle 500 is then used to transport apparatus 20 to a desired location. Once at the desired location, variable length controller 26 is activated toward the extended position so that stock 22 pivots about first 38 and second 42 wheels to a assume a substantially vertical position.

The preferred embodiments of the invention described herein are exemplary and numerous modifications, dimensional variations, and rearrangements can be readily envisioned to achieve an equivalent result, all of which are intended to be embraced within the scope of the appended claims.

What is claimed is:

1. A portable apparatus for containing an animal, comprising:

a stock for receiving the animal;

a tongue pivotally connected to said stock;

a variable length controller connected between said stock and said tongue;

said stock having a vertical position wherein said stock resides upon a support surface; and, when said stock is in said vertical position, said tongue pivotable to a vertical orientation abutting said stock, and said tongue also pivotal to a substantially horizontal orientation wherein said tongue rests upon the support surface.

2. An apparatus for containing an animal which may be towed by a vehicle, said apparatus comprising:

a stock for receiving the animal;

a tongue having a pivot end connected to said stock and an opposite towing end;

said tongue rotatable from a substantially vertical position to a substantially horizontal position wherein said tongue rests upon the ground or other support surface;

a variable length controller connected between said tongue and said stock, said variable length controller having an extended position and a retracted position;

so that when said towing end of said tongue is fixedly attached to the vehicle, and said variable length controller is activated toward said extended position said stock assumes a substantially vertical orientation; and, when said variable length controller is activated to said retracted position, said stock assumes a substantially horizontal orientation and is disposed above said tongue.

3. A method for using an apparatus for containing an animal, comprising:

providing said apparatus for containing the animal comprising a stock for receiving the animal, a tongue having a pivot end pivotally connected to said stock, said tongue having an opposite towing end, a variable length controller connected between said stock and said tongue, said stock pivotable about a first wheel and a second wheel, said stock oriented in a substantially vertical position, and said tongue oriented in a substantially vertical position;

providing a towing vehicle;

activating said variable length controller toward an extended position, thereby causing said tongue to rotate downward toward the towing vehicle;

connecting said towing end of said tongue to the towing vehicle;

activating said variable length controller to a retracted position so that said stock pivots about said first and second wheels to assume a substantially horizontal position above said tongue; and, using said towing vehicle to transport said apparatus to a desired location.

4. The method of claim 3 further including:

upon arrival at the desired location, activating said variable length controller toward said extended position so that said stock pivots about said first and second wheels to a assume a substantially vertical position.

* * * * *